(12) United States Patent
Demougeot et al.

(10) Patent No.: US 9,097,185 B2
(45) Date of Patent: Aug. 4, 2015

(54) STABILIZING A GAS TURBINE ENGINE VIA INCREMENTAL TUNING

(75) Inventors: Nicolas Demougeot, Jupiter, FL (US); Donald Gauthier, Ocean Ridge, FL (US); Hany Rizkalla, Stuart, FL (US); Peter Stuttaford, Jupiter, FL (US); Khalid Oumejjoud, Palm Beach Gardens, FL (US)

(73) Assignee: Alstom Technology Ltd, Baden (CH)

( * ) Notice: Subject to any disclaimer, the term of this patent is extended or adjusted under 35 U.S.C. 154(b) by 215 days.

(21) Appl. No.: 12/786,189

(22) Filed: May 24, 2010

(65) Prior Publication Data
US 2010/0300108 A1 Dec. 2, 2010

Related U.S. Application Data

(60) Provisional application No. 61/181,253, filed on May 26, 2009.

(51) Int. Cl.
*F02C 9/32* (2006.01)
*F02C 7/228* (2006.01)
(Continued)

(52) U.S. Cl.
CPC . *F02C 7/228* (2013.01); *F02C 9/28* (2013.01); *F02C 9/34* (2013.01); *F23R 3/343* (2013.01); *F23R 3/346* (2013.01); *F02C 9/32* (2013.01); *F05D 2270/082* (2013.01);
(Continued)

(58) Field of Classification Search
CPC ...................................... F02C 9/32; F02C 9/34
USPC ................ 60/39.281, 773, 776; 73/112.01, 73/112.03; 702/77, 85, 104, 107; 701/100
See application file for complete search history.

(56) References Cited

U.S. PATENT DOCUMENTS 3,080,885 A * 3/1963 Webster et al. ............... 137/471
5,699,663 A * 12/1997 Capelle et al. ................. 60/204
(Continued)

FOREIGN PATENT DOCUMENTS

| EP | 133148 A2 | 7/2003 |
|----|-----------|--------|
| EP | 1533569 A1 | 5/2005 |

(Continued)

OTHER PUBLICATIONS

International Search Report and Written Opinion, International Application No. PCT/US2010/036069, filed May 25, 2010, 13 pages.
(Continued)

*Primary Examiner* — Phutthiwat Wongwian
*Assistant Examiner* — Michael B Mantyla
(74) *Attorney, Agent, or Firm* — Shook, Hardy & Bacon L.L.P.

(57) ABSTRACT

An auto-tune controller and tuning process implemented thereby for measuring and tuning the combustion dynamics and emissions of a GT engine, relative to predetermined upper limits, are provided. Initially, the tuning process includes monitoring the combustion dynamics of a plurality of combustors and emissions for a plurality of conditions. Upon determination that one or more of the conditions exceeds a predetermined upper limit, a fuel flow split to a fuel circuit on all of the combustors on the engine is adjusted by a predetermined amount. The control system continues to monitor the combustion dynamics and to recursively adjust the fuel flow split by the predetermined amount until the combustion dynamics and/or emissions are operating within a prescribed range of the GT engine.

19 Claims, 3 Drawing Sheets

(51) Int. Cl.
  *F02C 9/28* (2006.01)
  *F02C 9/34* (2006.01)
  *F23R 3/34* (2006.01)

(52) U.S. Cl.
  CPC ...... *F05D 2270/301* (2013.01); *F05D 2270/31* (2013.01); *F23N 2041/20* (2013.01); *F23R 2900/00013* (2013.01)

(56) References Cited

U.S. PATENT DOCUMENTS

| | | | |
|---|---|---|---|
| 6,535,124 B1 | 3/2003 | Ditommaso et al. | |
| 6,742,341 B2 | 6/2004 | Ryan et al. | |
| 6,810,655 B2 | 11/2004 | Davis, Jr. et al. | |
| 6,823,675 B2 | 11/2004 | Brunell et al. | |
| 6,877,307 B2 | 4/2005 | Ryan et al. | |
| 6,955,039 B2 | 10/2005 | Nomura et al. | |
| 6,973,791 B2 * | 12/2005 | Handelsman et al. | 60/773 |
| 6,976,351 B2 | 12/2005 | Catharine et al. | |
| 7,024,862 B2 | 4/2006 | Miyake et al. | |
| 7,121,097 B2 * | 10/2006 | Yee et al. | 60/777 |
| 7,188,019 B2 | 3/2007 | Nomura et al. | |
| 7,210,297 B2 | 5/2007 | Shah et al | |
| 7,234,305 B2 | 6/2007 | Nomura et al. | |
| 7,269,939 B2 | 9/2007 | Kothnur et al. | |
| 7,269,952 B2 | 9/2007 | Arar et al. | |
| 7,269,953 B2 | 9/2007 | Gadde et al. | |
| 7,284,378 B2 | 10/2007 | Amond, III et al. | |
| 7,302,334 B2 * | 11/2007 | Hook et al. | 701/100 |
| 7,441,398 B2 | 10/2008 | Ziminsky et al. | |
| 8,061,118 B2 * | 11/2011 | Kothnur et al. | 60/39.281 |
| 8,417,433 B2 * | 4/2013 | Gauthier et al. | 701/100 |
| 8,474,268 B2 * | 7/2013 | Fuller et al. | 60/773 |
| 2003/0014219 A1 | 1/2003 | Shimizu | |
| 2004/0011051 A1 * | 1/2004 | Ryan et al. | 60/773 |
| 2004/0123653 A1 | 7/2004 | Benson | |
| 2006/0254279 A1 | 11/2006 | Taware et al. | 60/772 |
| 2007/0113563 A1 * | 5/2007 | Mulera et al. | 60/779 |
| 2009/0005952 A1 | 1/2009 | Tonno et al. | |
| 2009/0094984 A1 | 4/2009 | Colket | |
| 2009/0125207 A1 | 5/2009 | Nomura et al. | |
| 2009/0222187 A1 * | 9/2009 | Martling et al. | 701/100 |
| 2010/0286890 A1 * | 11/2010 | Chandler | 701/100 |
| 2011/0137536 A1 | 6/2011 | Tonno et al. | |

FOREIGN PATENT DOCUMENTS

| | | |
|---|---|---|
| EP | 1632718 A2 | 3/2006 |
| GB | 2434437 A | 7/2007 |
| JP | 08270461 A | 10/1996 |
| JP | 2003314305 | 11/2003 |
| JP | 2004316506 | 11/2004 |
| JP | 2006144796 | 6/2006 |
| JP | 2008270461 | 11/2008 |

OTHER PUBLICATIONS

International Search Report and Written Opinion, International Application No. PCT/US2011/033925, filed Aug. 16, 2011, 14 pages.

Notification of Transmittal of International Preliminary Report on Patentability, International Application No. PCT/US2010/036069, mailed Oct. 3, 2011, 33 pages.

* cited by examiner

STABILIZING A GAS TURBINE ENGINE VIA INCREMENTAL TUNING

CROSS REFERENCE TO RELATED APPLICATIONS

This Nonprovisional Patent Application is related to U.S. Provisional Application No. 61/181,253, filed May 26, 2009, entitled "AUTO-TUNING OF A GAS TURBINE ENGINE," teachings of which are hereby incorporated by reference in their entirety.

TECHNICAL FIELD

The present invention generally relates to automatically tuning a gas turbine engine. More specifically, a process and system are identified for providing a control system to automatically tune the gas turbine engine by incrementally adjusting one or more fuel flow splits within a combustor or incrementally adjusting the gaseous fuel temperature.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Increasingly, a control system is used to regulate the operation of the gas turbine engine. In operation, the control system receives a plurality of indications that communicate the current operating conditions of the gas turbine engine including pressures, temperatures, fuel flow rates, and engine frequencies. In response, the control system makes adjustments to the inputs of the gas turbine engine, thereby changing performance of the gas turbine engine based on the plurality of indications in light of look-up tables coded into the memory of the control system. Over time, this performance may fall outside a preferred operating range due to mechanical degradation of the gas turbine engine or changes in operational conditions such as ambient temperature or fuel constituents. For instance, the gas turbine engine may start operating beyond regulated emissions limits. As such, multiple manual tunings are required to update the control system. Manual-tuning is labor intensive and can create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during those window will capture those benefits typically missed with manual tuning.

SUMMARY

In accordance with the present invention, there is provided a novel way of monitoring operating conditions of a gas turbine engine and responding to conditions which exceed predetermined upper limits. Initially, various engine operating conditions can be monitored. By way of example, these operating conditions may include, but are not limited to, emissions, and combustor dynamics modes, such as Lean Blow Out (LBO), Cold Tone (CT), Hot Tone (HT), and Screech. When a monitored operating condition exceeds one or more of the predetermined upper limits, an engine parameter is changed to adjust this condition to bring it within the limits, thereby tuning the gas turbine engine.

More specifically, pressure fluctuations, also called combustion dynamics, may be detected (e.g., utilizing pressure transducers) in each combustor of the gas turbine engine. Next, a Fourier Transform may be applied to the pressure signals to convert the pressure signals into an amplitude versus frequency format. The maximum amplitude at pre-determined frequency band, within a timeframe, may be compared against a pre-determined upper pressure limit, or alarm level limit. Incident to comparison, when it is ascertained that the upper pressure limit is exceeded by the maximum amplitude, an appropriate corrective action is taken. In some instances, the appropriate action is carried out manually. In another instance, the appropriate action is implemented by the control system. For instance, the control system may initiate a process of altering one or more fuel flow splits within a fuel circuit of the combustor. In an exemplary embodiment, one fuel flow split is altered at a time by a predefined increment. As described herein, the phrase "predefined increment" is not meant to be construed as limiting, but may encompass a wide range of adjustments to the fuel flow splits. In one instance, the predefined increment is a uniform amount of adjustment that is consistently applied to one or more of the fuel flow splits. In another instance, the predefined amount is a varied amount of adjustment that is altered across fuel flow splits or across individual adjustments to a particular fuel flow split. By altering the fuel flow splits in this manner, the fuel-air mixing within the combustor is changed, thus, affecting the combustion signature. Upon affecting the combustion signature, the pressure fluctuations are altered.

This altered combustion dynamics amplitude, once stabilized, is again compared against the predetermined upper limit to verify whether the adjusted fuel flow split has moved the amplitude within an acceptable range. If the amplitude remains over the predetermined upper limit, the fuel flow split is once again adjusted by the predefined increment and the process is recursively repeated as necessary. Advantageously, changes are made to the fuel flow split consistently and uniformly at the same predetermined increment, thereby saving processing time to compute a customized value of an increment each time the predetermined upper limit is exceeded.

Accordingly, in an exemplary embodiment of the process of auto-tuning, a control system for monitoring and controlling the gas turbine engine is provided. This control system generally manages a majority of the processes involves with auto-tuning the combustor, and may be referred to as an auto-tune controller. Initially, the process includes monitoring the combustion dynamics and emissions of the combustor for a plurality of conditions. Upon determination that one or more of the conditions exceed the predetermined upper limit, a fuel flow split to a fuel circuit is adjusted by the predetermined amount. The control system, or auto-tune controller, continues to monitor the combustion dynamics and to dynamically adjust the fuel flow split by the predetermined amount until the combustion dynamics fall below the predetermined upper limit.

Further, in an alternate embodiment of the process of auto-tuning, the gas turbine engine is monitored and, based on the data recovered from monitoring, automatically adjusted. Generally, the automatic adjustment involves incrementing upward or downward the fuel flow split in order to maintain combustion dynamics and emissions within a preferred operating range, or above/below a limit. In particular, the alternate process initially includes detecting pressure signals in the combustor during the step of monitoring. Subsequent to, or coincident with, the step of monitoring, an algorithm is applied to the detected pressure signals. In one instance, applying the algorithm involves performing a Fourier Transform on the pressure signals to convert the pressure signals into frequency-based data or a spectrum. The amplitude of the frequency-based data is compared to predetermined upper limits (amplitude) for different known conditions. If it is determined that the amplitude of the frequency based data exceeds its respective predetermined upper limit, an incremental adjustment in the fuel flow split is made. In one instance, the incremental adjustment is a change in the fuel flow split carried out in a fixed and pre-determined amount. This incremental adjustment can either increase or decrease the fuel flow split depending on the frequency band being inspected and/or the type of fuel circuit being adjusted. This alternate process recursively repeats until the frequency-based data indicates the gas turbine engine is operating within a suggested range.

In one instance, if the alternate process has been recursively repeated a number of times such that the fuel flow split for a specific fuel circuit has reached a maximum allowable value, a second fuel flow split that affects a second fuel circuit may be adjusted by a predefined fixed amount. If the frequency-based data measured indicate that gas turbine engine is operating within a suggested range, then the alternate process is concluded. Otherwise, the second fuel flow split is recursively adjusted by the same predefined fixed amount until either the amplitude of the frequency-based data moves to acceptable levels or a maximum allowable value of the second fuel flow split is reached. In embodiments, the predefined fixed amount may vary based on which fuel flow split is being monitored, the number of increments of adjustment that have been applied to a particular fuel flow split, or another other conditions or parameters that impact the adjustment of the fuel flow split.

In another instance, if the alternate process has been recursively repeated a number of times such that the fuel flow split for a specific fuel circuit has reached a maximum allowable value, the incremental adjustment of the fuel flow split is ceased. Upon cessation of the incremental adjustment, an adjustment of gas temperature may be invoked to bring the operation of the gas turbine engine within a particular performance range. If the adjustment to the gas temperature fails to properly tune the gas turbine engine, an alarm indication is communicated to an operator. This alarm indication may be communicated to a console, a pager, a mobile device, or another technology adapted to receive an electronic message and relay a notification to the operator. The operator will be given the option of incrementing the fuel gas temperature or incrementing the engine firing temperature. If this option is selected, the auto-tune controller will incrementally adjust either of these parameters and repeat this process until the unit is in compliance or a maximum limit is reached. In the event this process is not successful, an alarm indication may alert the operator that automatic tuning has failed to bring the operation of the gas turbine engine within the suggest range, and that manual adjustments to the combustor or the control system are recommended prior to completing tuning.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
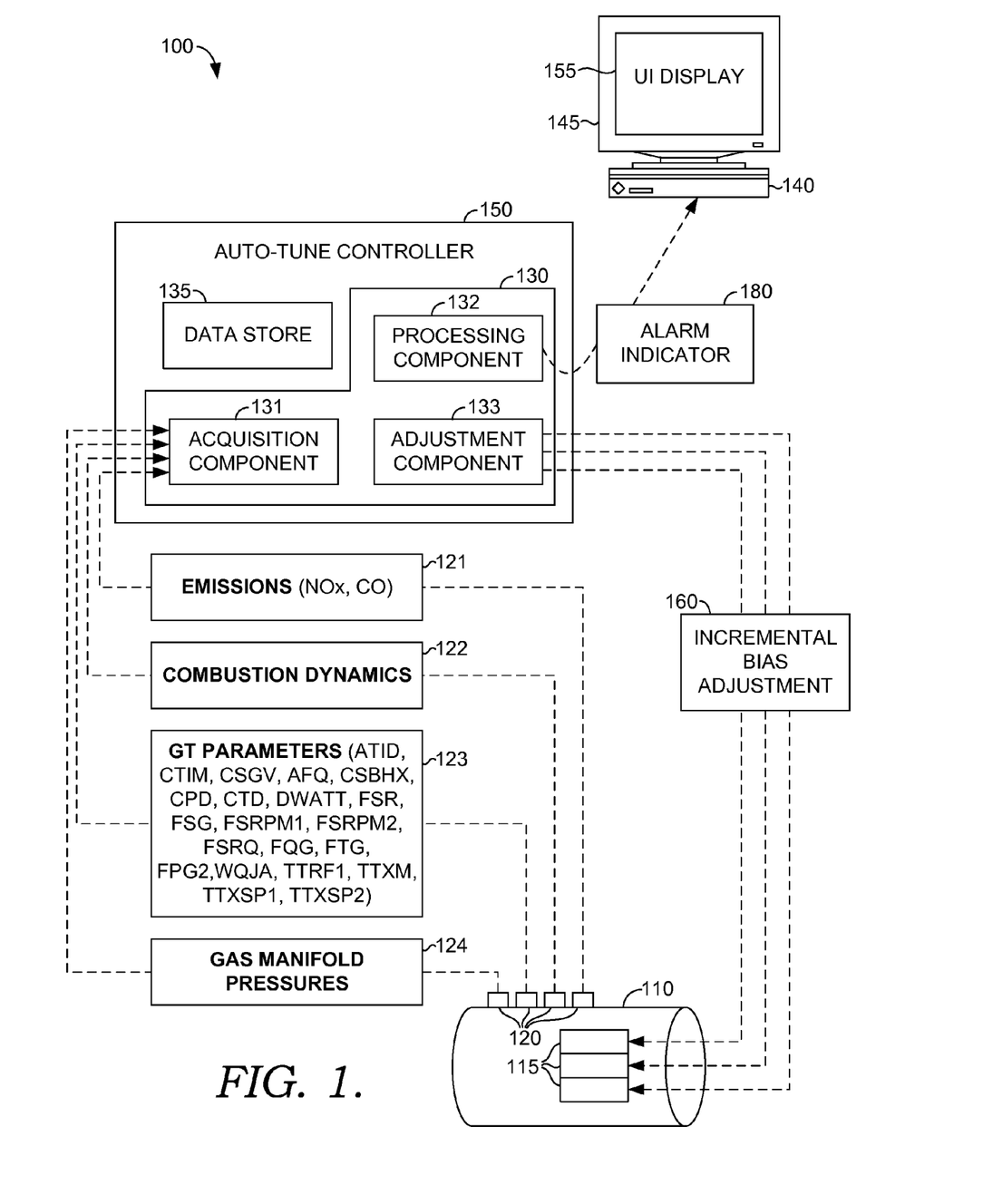
FIG. 1 is a block diagram of an exemplary tuning environment suitable for use in embodiments of the present invention.

As described above, embodiments of the present invention generally relate to automatically tuning a gas turbine engine. With reference to FIG. 1, a gas turbine engine 110 is depicted that accommodates a plurality of combustors 115. Generally, for the purpose of discussion, the gas turbine (GT) engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby (see reference numeral 400 of FIG. 4), can be applied to any number of configurations of GT engines and that the type of GT engines describe hereinbelow should not be construed as limiting on the scope of the present invention.

As discussed above, the plurality of combustors 115 (e.g., low emission combustors) may be prone to elevated levels of pressure fluctuation within the combustor liner. This pressure fluctuation is referred to as "combustion dynamics." Left alone, combustion dynamics can have a dramatic impact on the integrity and life of the plurality of combustors 115, eventually leading to catastrophic failure. These combustion dynamics may be mitigated by adjusting fuel flow splits of the combustor gas flow between several groups of nozzles within the plurality of combustors 115. Generally, a fuel flow split is commonly adjust for each of the plurality of combustors 115, thus the combustors (burners) are tuned alike, as opposed to tuning at the individual burner level. These different "fuel flow splits" are occasionally tuned to ensure that acceptable levels (conventionally low levels) of the combustion dynamics are maintained while, at the same time, promoting acceptable emission levels. The acceptable emission levels relate to the amount of pollutant that is generated by the GT engine 110. Schedules, which govern the fuel flow split for each fuel circuit, are typically hard coded into a control system (not shown) of GT engine 110. In one instance, these schedules are a function of a reference that could be, amongst other things, a turbine inlet reference temperature (TIRF) or a load on the GT engine 110.

Over time, several parameters will affect the combustion dynamics. In particular ambient condition changes and/or gas composition variation and/or normal wear may degrade the operation of the GT engine. This degradation leads to regular "re-tuning" of the combustor to maintain combustion dynamics and emissions within acceptable limits. As discussed herein, an automatic tuning control system, or the auto-tune controller 150 of FIG. 1, is used to assess the state of the GT engine 110 and the plurality of combustors 115 in terms of parameters such as the combustion dynamics, air flow, fuel flows, emissions, and pressure distribution. Based on those parameters, the adequate fuel flow splits are arrived upon by incrementally adjusting the fuel flow splits until the alarm has been cleared, where the alarm is set upon detecting that an amplitude of a pressure pulse surpasses a predetermined upper limit. Accordingly, embodiments of the present invention concern the auto-tune controller 150 and the associated tuning process that enables automatic tuning of the combustion dynamics and emissions using small, consistent incremental changes of the fuel flow split.

An overall tuning process carried out by the auto-tune controller 150 may comprise one or more of the steps described immediately below. Initially, various configurations of pressure signals of the plurality of combustors 115 are monitored and recorded. These recorded pressure signals are passed through a Fourier Transform, where the pressure signals are converted into an amplitude versus frequency data format or spectrum. The amplitude and frequencies are then monitored and the amplitude is compared to a predetermined upper limit for each pre-defined frequency band. The predetermined upper limit is generally defined in terms of pounds per square inch (psi) for a predefined frequency bands. However, in other instances, the predetermined upper limits may be expressed in other terms or units, where other types are devices are used to measure performance of the combustors 115 (e.g., accelerometers). If the determination is made that one or more of the frequency-based amplitude exceeds its respective predetermined upper limit for a pre-determined frequency band, then the auto-tune controller 150 firstly determines which fuel flow split to adjust, and secondly alters the fuel flow split associated with the specific frequency band. This adjustment made to the fuel flow split is executed at a predefined amount.

Once the fuel flow split adjustment is made, the process reiterates. That is, the steps of monitoring and comparing the amplitude for a number of predetermined frequency bands to a predetermined upper limit, and adjusting a predetermined fuel flow splits are repeated if the dynamic pressure amplitude is above the predetermined upper limit. Specifically, when the dynamic pressure amplitude is ascertained to exist above the predetermined upper limit, the same predetermined adjustment is made to the fuel flow split. The tuning process repeats as required until the dynamic pressure amplitude falls below the predetermined upper limit or until the fuel flow split cannot be adjusted any further.

If a first fuel flow split cannot be adjusted further, then either a second fuel flow split is adjusted by a second predefined rate and the tuning process repeats, or an alarm indication is issued to an operator. With respect to adjusting the second fuel flow split, the tuning process repeats until the dynamic pressure amplitude falls under the predetermined upper limit or the second fuel split cannot be adjusted any further. If a second fuel flow split cannot be adjusted further, then a third or more fuel flow splits are adjusted.

Although a scheme for iteratively adjusting fuel flow splits in succession has been described immediately above, it should be understood and appreciated by those of ordinary skill in the art that other types of suitable schemes that adjust fuel flow splits may be used, and that embodiments of the present invention are not limited to those schemes that focus on one fuel flow split at a time. For instance, one embodiment of the tuning scheme may iteratively adjust a first fuel flow split by a predefined increment until the dynamic pressure amplitude falls under the predetermined upper limit or until a particular number of iterations is reached, whichever occurs first. If the particular number of iterations is reached, the tuning scheme causes a second fuel flow split to be iteratively adjusted by another predefined increment until the dynamic pressure amplitude falls under the predetermined upper limit or until another particular number of iterations is reached, whichever occurs first. If the other particular number of iterations is reached, the tuning scheme returns to the first fuel flow split. Specifically, the tuning scheme causes the first fuel flow split to again be iteratively adjusted by the predefined increment until the dynamic pressure amplitude falls under the predetermined upper limit or until a third particular number of iterations is reached, whichever occurs first. The tuning scheme may then return to the second fuel flow split or turn to a third fuel flow split for the purposes of adjustment.

Figure 4:
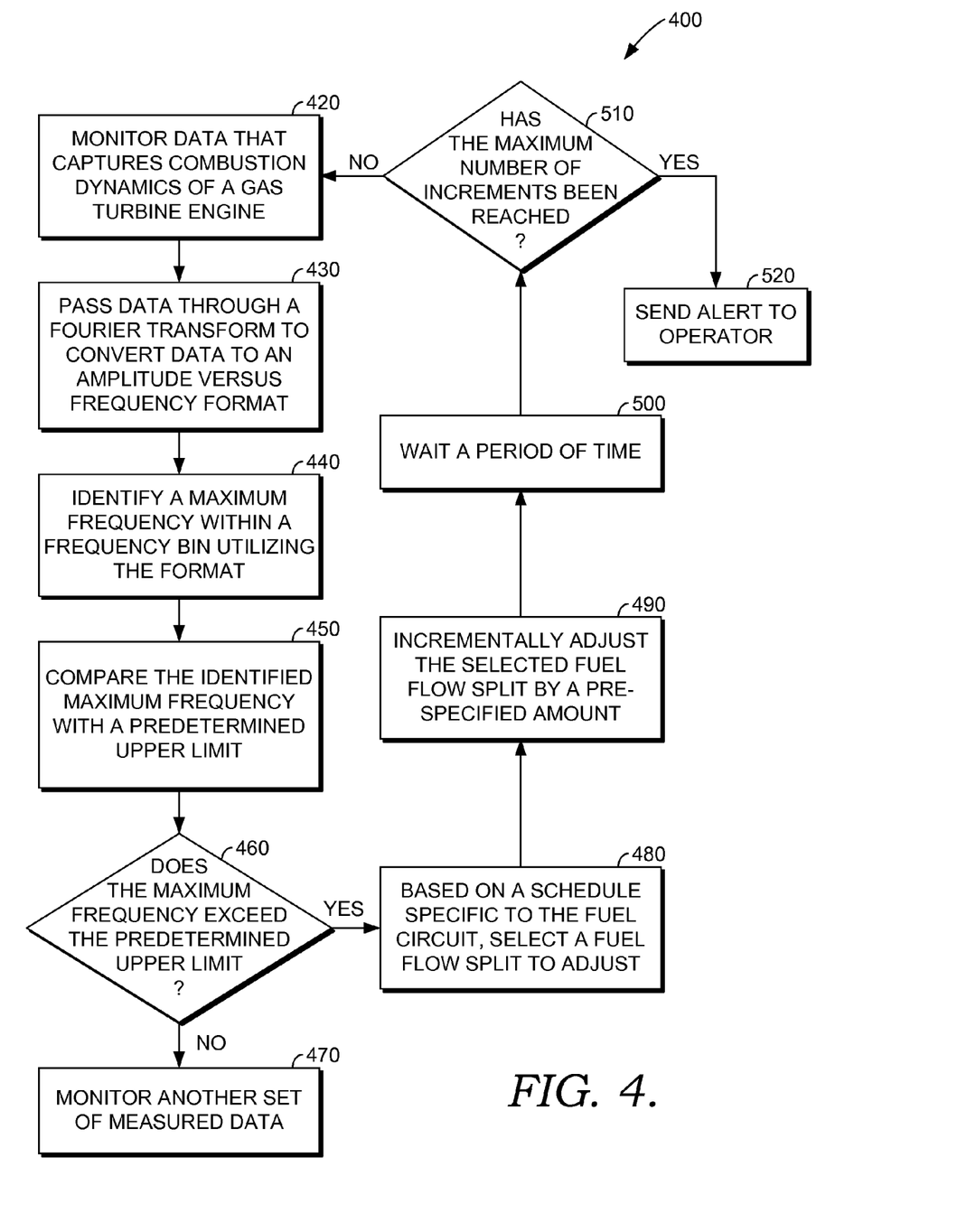
FIG. 4 is a flow diagram of an overall method for employing an auto-tune controller to implement a tuning process that includes collecting measurements from a combustor and altering the fuel flow splits based on the measurements, in accordance with an embodiment of the present invention.

With reference to FIGS. 1 and 4, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the GT engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 100 is provided with the data store 135. Generally, the data store 135 is configured to store information associated with the tuning process or data generated upon monitoring the GT engine 100. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For instance, the data store 135 may be searchable for schedules in order to determine which fuel flow split to increment upon comparing measured dynamic pressure amplitude to a corresponding predetermined upper limit. It will be understood and appreciated that the information stored in the data store 135 may be configurable and may include any information relevant to the tuning process. The content and volume of such information are not intended to limit the scope of embodiments of the present invention in any way.

In embodiments, the auto-tune controller 100 will record look-up tables (e.g., utilizing the data store 135 of FIG. 1). These look-up tables may include various information related to the operational conditions of the GT engine and combustors attached thereto. By way of example, the look-up tables may include an operating curve with a suggested tolerance band that defines the outer limits of efficient operation. Upon performing the process of automatically tuning the GT engine, the auto-tune controller may be automatically reprogrammed to record aspects of the tuning process in the operating curve. That is, the operating curve in the look-up table is altered to reflect occurrences during, and results from, the tuning process. Advantageously, the altered operating curve may be access during the next tuning procedure, thus, making each subsequent tuning more efficient (e.g., reduce the number of fuel flow adjustment increments needed to bring a condition below the predetermine upper limit). In this way the look-up table (e.g., operational matrix) can be automatically developed through the incremental adjustment of one parameter at a time. Since the incremental adjustment is stored in the operational curve, the auto-tune controller learns the optimum tuning performance for any particular operating system. This greatly reduces the amount of tuning required which will be beneficial for units on auto grid control (AGC) where stable points may be infrequent or for units experiencing sudden cyclic variations in fuel properties or ambient conditions.

In some embodiments, should the tuning by way of adjusting the fuel flow split not alleviate an emissions or dynamics alarm, an incremental bias can be supplied to adjust fuel temperature from the optimum out-of-compliance split tuning point identified per the section above. However, if incrementally biasing the fuel temperature is not an option—due to absent or limited fuel temperature manipulation ability—and the unit remains in alarm mode, a request may be issued to allow adjustment of the firing curve of the GT device. If the operator request is granted, an incremental firing temperature bias is provided to the existing unit firing curve at the optimum out-of-compliance point described in the above section.

With continued reference to the look-up table stored on the auto-tune controller 100, variations of the look-up table configuration will now be described. In one instance, a number of look-up tables are provided that graph splits versus TIRF, or load. Each of these look-up tables relate to a combination of a number of ambient temperatures and gas parameters. The "gas parameter" is characteristic of the gas composition and properties, and may be implemented as a relative value as compared to a nominal initial value. The tuning adjustment is performed at a stable TIRF, or load. Whenever an incremental bias adjustment is needed because an alarm level or emission level was exceeded, the algorithm first determines which ambient temperature and gas parameter family the unit is operating in, and then which fuel split to change and in which direction. Secondly, the desired bias increment (upwards or downwards) and the current TIRF, or load, is recorded. The algorithm then determines which table shall be modified depending on the recorded ambient temperature and gas parameter. Once defined, the algorithm determines which points in the split versus TIRF graph are bracketing the current value for TIRF. Upon identifying those two points, the bias value for the two points is incrementally modified (upwards or downwards), and the increment is stored in the correct look-up table.

Further, the exemplary tuning environment 100 includes the computing device 140, which is operably coupled to a presentation device 145 for displaying a user interface (UI) display 155 that warns an operator of a failure to automatically tune the GT engine 100. The computing device 140, shown in FIG. 1, may take the form of various types of computing devices. By way of example only and not limitation, the computing device 145 may be a personal computer, desktop computer, laptop computer, handheld device, consumer electronic device (e.g., pager), handheld device (e.g., personal digital assistant), various servers, and the like. It should be noted, however, that the invention is not limited to implementation on such computing devices, but may be implemented on any of a variety of different types of computing devices within the scope of embodiments of the present invention.

With reference to FIG. 4, a tuning process 200 will now be discussed in light of the exemplary tuning environment 100 of FIG. 1. Generally, FIG. 4 is a flow diagram of an overall method 400 for employing the auto-tune controller 150 of FIG. 1 to implement a tuning process that includes collecting measurements from the plurality of combustors 115 and altering the fuel flow splits based on the measurements, in accordance with an embodiment of the present invention. Initially, the overall method 400 includes monitoring data that represents combustion dynamics of the GT engine 100. In one embodiment, the combustion dynamics 122 are measured for each of the plurality of combustors 115 using the sensors 120 (e.g., pressure transducers) that communicate the measurement data to the acquisition component 131. In another embodiment, the sensors 120 communicate emissions 121 that are detected from the GT engine 100. In yet other embodiments, the measurement data collected from the GT engine 110 may include, but is not limited to, GT parameters 123 and gas manifold pressures 124.

In some instances, the data collected from the GT engine 100 is normalized. For instance, the sensors 120 may be configured as pressure transducers that detect pressure fluctuations in each of the plurality of combustors 115 and report those fluctuations as the combustion dynamics 122. The fluctuations may be measured over a time period and sent to the acquisition component 131 in the form of a rolling average of pressure variability.

Step 430 of the overall method 430 pertains to passing the measured data through a Fourier Transform, or another appropriate algorithm, in order to convert the data to an amplitude versus frequency format (utilizing the processing component 132 of FIG. 1). This amplitude versus frequency format may take on a variety of configurations, such as a graph, a chart, or a matrix, and is referred to hereinbelow as a "spectrum." In one instance, when the amplitude versus frequency format takes on the configuration of a matrix, the matrix may include the following categories of values: combustor identity, frequency, and amplitude.

In embodiments, the spectrum may be divided by frequency range, or discretized, into a number of frequency bands, where each band has its own predetermined upper limit in terms of amplitude. The spectrum may be discretized into any number of frequency bands. In one instance, the spectrum is discretized into 4-6 frequency bands, or windows, based on the type of GT engine 100 being tuned, where each frequency band expresses a different parameter. In operation, when the predetermined upper limit (i.e., alarm level limit) for a particular frequency band is exceeded, the schedule instructions the auto-tune controller 150 which fuel flow split to change and in which direction (upwards or downwards) to make an adjustment. Typically, the proper fuel flow split to change and the proper manner of adjustment are selected based on the type of measured data being processed (e.g., combustor dynamics or emission levels) and the nature of the measured data being processed (e.g. combustor dynamics tone, type of emission such as NOx or Co).

In step 440, a maximum dynamic pressure amplitude is identified within each of the frequency bands. This maximum dynamic pressure amplitude may be determined by selecting the maximum dynamic pressure amplitude for each class of measured data (combustion dynamics 122) within one or more of the frequency bands. Both the predetermined upper limit (i.e., alarm limit level) and the maximum dynamic pressure amplitude derived from each frequency band are measured in terms of pounds per square inch (psi).

As depicted in step 450, the identified maximum dynamic pressure amplitude is compared against an appropriate predetermined upper limit. (There is no specific priority order to comparing or addressing outlier maximum frequencies.) This predetermined upper limit may be based on a type of measured data being evaluated and/or the fuel circuit being tuned. Upon comparison, a determination of whether the maximum dynamic pressure amplitude exceeds the predetermined upper limit is performed, as depicted at step 460. If the maximum dynamic pressure amplitude does not exceed the predetermined upper limit, such that the GT engine 100 is operating within a suggested range with respect to the particular measured data, the tuning process moves to another condition. That is, the tuning process proceeds to monitor and evaluate another set of measured data, as depicted at step 470. By way of clarification, just the dynamic pressure amplitude is monitored in a series of frequency bins. Other parameters are not a function of frequency bins, but still are subject to maximum tuning limits.

If, however, the maximum dynamic pressure amplitude does exceed the predetermined upper limit, a fuel flow split is selected for adjustment. This is indicated at step 480 of FIG. 4. As discussed above, the appropriate fuel flow split is selected by a schedule, as discussed more fully below with reference to FIGS. 2 and 3. This selected fuel flow split is then incrementally adjusted by a pre-specified amount, as depicted at step 490. Incrementally adjusting the fuel flow split may be accomplished by the adjustment component 133 of FIG. 1 transmitting an incremental bias adjustment 160 to at least one of the plurality of combustors 115 mounted to the GT engine 100. In one embodiment, automatic valves on the combustors 115 adjust the fuel flow split for a subject fuel circuit in response to recognizing the incoming incremental bias adjustment 160.

This predefined amount is typically based on testing experience and the combustor identity (as provided by the matrix). In one instance, the predefined amount of incremental adjustment is 0.25% adjustment of the fuel flow split between the injection ports. Accordingly, by incrementing a fuel flow split upwards or downwards by the pre-specified amount, the pattern of fuel flow distribution through injection points is altered. However, even though the fuel flow split is changed, the total fuel flow to the fuel circuit is generally held constant.

Upon applying the incremental bias adjustment 160, the auto-tune controller 150 waits a period of time before acquiring and processing data extracted from the GT engine 100. This is depicted at step 500 of FIG. 4. Waiting the period of time ensures that the GT engine 100 stabilizes before checking to determine whether adjusting the fuel flow split was sufficient to tune the GT engine 100. In embodiments, the period of time that is waited between adjustments may vary based on the type of parameter, or measured data, being processed. For instance, the period of time required to stabilize a combustion dynamic may be less that the period of time required to stabilize emissions.

At step 510, a determination is performed to ascertain whether a maximum number of increments has been reached. If the maximum number of increments that the fuel flow split can be adjusted is not reached, the process is allowed to reiterate. Accordingly, the fuel flow split can be adjusted at least one more time if the comparison step 450 indicates that further incremental adjustment is needed. However, if the maximum number of increments that the fuel flow split can be adjusted is not reached, then either another fuel flow split can be adjusted (as determined by the schedule), or an alert is sent to an operator. This is depicted at step 520. In one embodiment, an alarm indicator 180 is sent to the computing device 140 by the processing component 132. In response to the alert, the operator may take action to manually tune the GT engine 100 or contact a technician to service the GT engine 100.

In some embodiments, sending an alert to the operator is the first action that is taken, as instructed by the schedule. That is, if the measured data for a particular parameter, upon processing the data through the Fourier Transform, exceeds a corresponding predetermined upper limit, then the first action taken is notifying the operator of the discrepancy, as opposed to incrementally adjusting a fuel flow split.

Another embodiment allows the operator to allow the auto-tune controller 150 to incrementally adjust the fuel gas temperature and/or the firing temperature to achieve in compliance operation.

Figure 2:
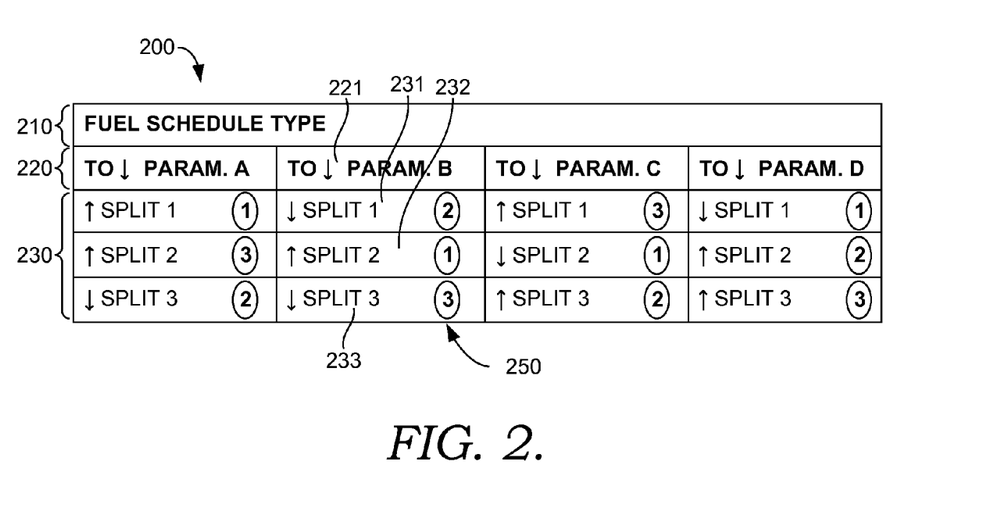
FIG. 2 is an exemplary chart depicting recommended fuel flow split adjustments for a fuel-rich condition, in accordance with an embodiment of the present invention.

Turning now to FIG. 2, an exemplary chart 200, or schedule, depicting recommended fuel flow split adjustments for a fuel-rich condition are provided, in accordance with an embodiment of the present invention. As illustrated, the chart 200 includes an indication 210 of the type of fuel being consumed by the GT engine being tuned. Further, the chart includes a row 220 that lists the conditions being monitored. In this exemplary chart 200, there are four conditions being monitor, which are parameters A-D. Although four conditions are monitored in this instance, the number of monitored conditions should not be construed as limiting, as any number of conditions may be observed for auto-tuning the GT engine. Generally, parameters A-D may represent particular conditions that are measured using pressure transducers, emissions-testing devices, accelerometers, and other items that are capable of monitoring the operation of the GT engine. By way of example, parameter A may represent Lean-Blowout (LBO), parameter B 221 may represent Cold Tone (CT), parameter C may represent Hot Tone (HT), and parameter D may represent Nitrogen-Oxides (NOx). Accordingly, in this example, parameters A-C relate to pressure data, while parameter D relates to a gas composition. Typically, the gas composition is determined by monitoring the concentrations levels of emissions (e.g., CO and NOx). A tuning process with incremental adjustments, similar to the one described above, may be used in connection with conditions that involve emissions.

Each of parameters A-D is automatically monitored during the tuning process. Further, the data monitored during the tuning process is processed via the Fourier Transform to determine a maximum amplitude for each condition. If any of the maximum amplitudes for these conditions exceeds or falls below an individual, predetermined limit mapped to each of the parameters A-D, respectively, the actions 230 are carried out.

By way of example, if the maximum amplitude for parameter B 221 (e.g., the CT condition) exceeds an individual, predetermined upper limit mapped to parameter B 221, the actions 231, 232, and 233 are carried out based on the ordering 250. Specifically, if the maximum dynamic pressure amplitude for the parameter B 221 exceeds the predetermined upper limit, the SPLIT 2 232 is initially increased by the incremental amount, as indicated by the ordering 250. Then, upon recursively increasing the SPLIT 2 232 by an incremental amount until the maximum number of adjustments for that fuel flow split is reached, the SPLIT 1 231 is decreased. Next, if adjusting the SPLIT 1 231 is ineffective, the SPLIT 3 233 is exercised. Last, if adjusting the SPLIT 3 233 is ineffective to reduce the maximum frequency amplitude below the predetermined upper limit, an alarm is sent to an operator. As will be recognized in the relevant field, the exemplary method above is just an example of a process for auto-tuning a particular engine, such as the 7FA Engine, and there will be different methods, which include different monitored parameters and varied fuel flow splits, for auto-tuning other engines.

Although a single configuration of a schedule (e.g., chart 200) for selecting which actions to take in light of the predetermined upper limits being exceeded has been described, it should be understood and appreciated by those of ordinary skill in the art that other types of suitable schedule that provide an organized hierarchy of actions may be used, and that embodiments of the present invention are not limited to the conditions and actions of the schedule described herein. In addition, it should be noted that the auto-tune controller can be used with a variety of combustion systems. Therefore, the present invention is not limited to just three fuel split adjustments. The exact quantity of fuel nozzles and fuel flow splits can vary depending on the combustor configuration and type of GT engine being tuned. So, for a different combustion system, the number of adjustment points could be greater or fewer than those depicted in the present disclosure without departing from the essence of the present invention.

Further, the chart 200 depicts adjustments to fuel flow splits in response to multiple frequency bands for various monitored conditions. In the event that multiple frequencies exceed their respective predetermined upper limits, no preference or priority is made by the auto-tune controller for determining which frequency to address first. However, in other instances, some preferential guidelines are utilized by the auto-tune controller 150 of FIG. 1 to make decisions as to which order the frequencies are addressed.

Figure 3:
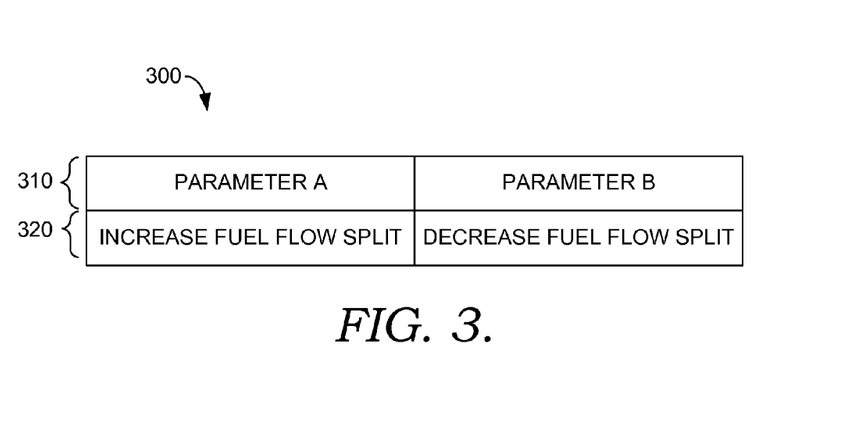
FIG. 3 is an exemplary chart depicting recommended fuel flow split adjustments for a combustor that is provided with two injection ports, in accordance with an embodiment of the present invention.

With reference to FIG. 3, an exemplary chart 300 depicting recommended fuel flow split adjustments 320 for a combustor that is provided with two injection ports is shown, in accordance with an embodiment of the present invention. Because, only two injection ports are provided, there is only one fuel flow split that can be adjusted to distribute fuel between the injection ports provided. Further, two conditions 310 of the GT engine being tuned are measured in this instance. These conditions 310 are represented by Parameter A and Parameter B. If either Parameter A or B exceeds a corresponding, predetermined upper limit, the schedule indicates which of the fuel flow split adjustments 320 to take. If adjusting the prescribed fuel flow split a maximum recommended number of times does not bring the GT engine into a normal operational range, then the next step involves sending an alarm to an operator or automatically placing a call to a technician.

Various benefits arising from automatic tuning can be realized when automatic tuning is compared against the current tuning processes. That is, because the tuning process of the present invention can be implemented automatically, the disadvantages of manually tuning are overcome. For instance, automatically tuning can be performed quickly and often, which will substantially prevent degradation that would have occurred before the manual tuning. Further, frequently tuning reduces excess pollutants/promotes lower emissions while improving engine life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for automatically tuning a combustor of a gas turbine engine, the method comprising:
   monitoring at least one operating condition of the gas turbine engine;
   determining that the at least one operating condition overcomes a threshold value associated with the at least one operating condition; and
   based on determining that the at least one operating condition overcomes the threshold value, performing a tuning process comprising:
   (a) comparing an identity of the at least one operating condition against a schedule, the schedule providing, for the at least one operating condition, an identity of a predefined fuel flow split for adjustment and a predefined manner of adjustment for the predefined fuel flow split;
   (b) selecting the predefined fuel flow split corresponding to the at least one operating condition from the schedule to target for adjustment, wherein selecting the predefined fuel flow split is based on (1) the identity of the at least one operating condition, (2) a predefined preferential guideline, and (3) a look-up table comprising an operating curve that corresponds to an ambient temperature parameter and a gas parameter;
   (c) adjusting the selected predefined fuel flow split by a predefined increment according to the predefined manner of adjustment, wherein the selected predefined fuel flow split governs a portion of a total fuel flow that is directed to two or more fuel nozzles of the combustor's fuel circuit, and wherein adjusting the selected predefined fuel flow split by the predefined increment comprises consistently applying a uniform amount of adjustment to the selected predefined fuel flow split;
   obtaining a result of the tuning process; and
   updating the look-up table based on the result of the tuning process, wherein the updated look-up table increases an efficiency of a future tuning process.

2. The method of claim 1, wherein monitoring the at least one operating condition of the gas turbine engine comprises:
   recording pressure pulses of the combustor; and
   passing the recorded pressure pulses through a Fourier Transform to form frequency readings associated with the recorded pressure pulses.

3. The method of claim 2, wherein determining that the at least one operating condition overcomes the threshold value comprises:
   comparing a maximum amplitude of the pressure pulses against predetermined upper limits associated with at least one combustor mode; and
   detecting the maximum amplitude exceeds at least one of the predetermined upper limits.

4. The method of claim 3, further comprising verifying that the adjustment to the selected predefined fuel flow split reduced the at least one operating condition corresponding to the selected predefined fuel flow split below the threshold value.

5. The method of claim 4, wherein the verifying comprises:
   pausing for a period of time such that the at least one operating condition corresponding to the selected predefined fuel flow split stabilizes;
   rerecording the pressure pulses of the combustor; and
   determining whether a subsequent maximum amplitude, derived from the rerecorded pressure pulses, exceeds at least one of the predetermined upper limits.

6. The method of claim 5, further comprising, when it is determined that the subsequent maximum amplitude exceeds the at least one of the predetermined upper limits, implementing another adjustment of the selected predefined fuel flow split by the predefined increment.

7. The method of claim 5, further comprising, when it is determined that the subsequent maximum amplitude falls within an acceptable operating range, ceasing adjustment of the selected predefined fuel flow split.

8. The method of claim 1, wherein the uniform amount of adjustment consistently applied to the selected predefined fuel flow split is based on the identity of the selected predefined fuel flow split presently being adjusted.

9. The method of claim 1, wherein the at least one operating condition comprises emissions of the gas turbine engine.

10. The method of claim 1, wherein the at least one operating condition comprises combustor dynamics that include lean blow out, cold tone, hot tone, and screech.

11. The method of claim 1, wherein adjusting the selected predefined fuel flow split by the predefined increment comprises making a determination to either increase or decrease the selected predefined fuel flow split based on the schedule.

12. The method of claim 1, wherein adjusting the selected predefined fuel flow split by the predefined increment comprises making a determination to either increase or decrease the selected predefined fuel flow split as a function of the identity of the predefined fuel flow split selected for adjustment.

13. A system comprising:
   a gas turbine engine including one or more combustors, wherein fuel flow splits govern a flow of fuel through fuel circuits for the one or more combustors; and
   an auto-tune controller for controlling an auto-tuning process comprising:
   monitoring at least one operating condition of the gas turbine engine,
   determining the at least one operating condition overcomes a threshold value,
   based on determining that the at least one operating condition overcomes the threshold value, comparing an identity of the at least one operating condition against a schedule, the schedule providing, for the at least one operating condition, an identity of a predefined fuel flow split for adjustment and a predefined manner of adjustment for the predefined fuel flow split,
   determining a selected fuel flow split to target for adjustment, wherein determining the selected fuel flow split to target for adjustment is based on (1) the identity of the at least one operating condition, (2) a predefined preferential guideline, and (3) a look-up table comprising an operating curve that corresponds to an ambient temperature parameter and a gas parameter, adjusting the selected predefined fuel flow split by a predefined increment according to the predefined manner of adjustment, wherein the selected predefined fuel flow split governs a portion of a total fuel flow that is directed to two or more fuel nozzles of the combustor's fuel circuit, and wherein adjusting the selected predefined fuel flow split by the predefined increment comprises consistently applying a uniform amount of adjustment to the selected predefined fuel flow split;

obtaining a result of adjusting the selected predefined fuel flow split; and updating the look-up table based on the result of adjusting the selected predefined fuel flow split, wherein the updated look-up table increases an efficiency of a future auto-tuning process.

14. The system of claim 13, wherein the auto-tuning process further comprises utilizing the schedule to determine an incremental amount to adjust the selected predefined fuel flow split.

15. The system of claim 14, wherein the auto-tuning process further comprises:
upon making the adjustment to the selected predefined fuel flow split, determining a number of adjustments recursively made to the selected predefined fuel flow split; and
when the number of recursive adjustments reaches an allowable number of iterations, taking an action prescribed by the schedule.

16. The system of claim 15, wherein the action prescribed by the schedule includes selecting and adjusting a different fuel flow split.

17. The system of claim 13, wherein the auto-tuning process further comprises utilizing the schedule to determine a direction in which to make the adjustment to the selected predefined fuel flow split.

18. One or more computer readable media that, when invoked by computer-executable instructions, perform a method for auto-tuning a combustor of a gas turbine engine, the method comprising:
monitoring a plurality of operating conditions of the gas turbine engine;
determining that at least one of the plurality of operating conditions overcomes a threshold value;
based on determining that the at least one of the plurality of operating conditions overcomes the threshold value, performing a tuning process comprising:
(a) comparing an identity of the at least one of the plurality of operating conditions against a schedule, the schedule providing, for the at least one of the plurality of operating conditions, an identity of a predefined fuel flow split for adjustment and a predefined manner of adjustment for the predefined fuel flow split,
(b) selecting the predefined fuel flow split corresponding to the at least one of the plurality of operating conditions from the schedule to target for adjustment, wherein selecting the predefined fuel flow split is based on (1) the identity of the at least one of the plurality of operating conditions, (2) a predefined preferential guideline, and (3) a look-up table comprising an operating curve that corresponds to an ambient temperature parameter and a gas parameter; and
(c) adjusting the predefined fuel flow split by a predefined increment according to the predefined manner of adjustment, wherein the predefined fuel flow split governs a portion of a total fuel flow that is directed to two or more fuel nozzles of the combustor's fuel circuit, and wherein adjusting the predefined fuel flow split by the predefined increment comprises consistently applying a uniform amount of adjustment to the predefined fuel flow split;

obtaining a result of the tuning process; and updating the look-up table based on the result of the tuning process, wherein the updated look-up table increases an efficiency of a future tuning process.

19. A computerized method, implemented by a processing unit, for automatically turning a gas turbine engine, the method comprising:
monitoring a plurality of operating conditions of the gas turbine engine;
determining that at least one of the plurality of operating conditions overcomes a threshold value;
based on determining that the at least one of the plurality of operating conditions overcomes the threshold value, performing a tuning process comprising:
comparing an identity of the at least one of the plurality of operating conditions against a schedule, the schedule providing, for the at least one of the plurality of operating conditions, an identity of a predefined fuel flow split for adjustment and a predefined manner of adjustment for the predefined fuel flow split,
selecting the predefined fuel flow split corresponding to the at least one of the plurality of operating conditions from the schedule to target for adjustment, wherein selecting the predefined fuel flow split is based on (1) the identity of the at least one of the plurality of operating conditions (2) a predefined preferential guideline, and (3) a look-up table comprising an operating curve that corresponds to an ambient temperature parameter and a gas parameter, and
adjusting the selected predefined fuel flow split by a predefined increment according to the predefined manner of adjustment, wherein the selected predefined fuel flow split governs a portion of a total fuel flow that is directed to two or more fuel nozzles of the combustor's fuel circuit, and wherein adjusting the selected predefined fuel flow split by the predefined increment comprises consistently applying a uniform amount of adjustment to the selected predefined fuel flow split;

obtaining a result of the tuning process; and updating the look-up table based on the result of the tuning process, wherein the updated look-up table increases an efficiency of a future tuning process.

* * * * *